United States Patent [19]

Orain

[11] Patent Number: 4,702,723
[45] Date of Patent: * Oct. 27, 1987

[54] HOMOKINETIC JOINT HAVING PIVOTABLE JAWS WITH COMPLEMENTARY SETS OF TEETH FOR CONJUGATE PIVOTAL MOVEMENT THEREOF

[75] Inventor: Michel A. Orain, Conflans Sainte Honorine, France

[73] Assignee: Glaenzer Spicer, Poissy, France

[*] Notice: The portion of the term of this patent subsequent to Aug. 25, 2004 has been disclaimed.

[21] Appl. No.: 854,748

[22] Filed: Apr. 22, 1986

[30] Foreign Application Priority Data

Apr. 25, 1985 [FR] France ................................. 85 06347

[51] Int. Cl.⁴ .............................................. F16D 3/20
[52] U.S. Cl. ................................... 464/120; 464/167; 464/905
[58] Field of Search ............... 464/109, 111, 120, 122, 464/123, 124, 162, 167, 905

[56] References Cited

U.S. PATENT DOCUMENTS

| | | | |
|---|---|---|---|
| 952,413 | 3/1910 | Breed | 464/122 |
| 2,670,614 | 3/1954 | Wildhaber | 464/124 |
| 2,777,306 | 1/1957 | Wildhaber | 464/905 X |
| 2,787,144 | 4/1957 | Chauvel | 464/167 |
| 3,621,676 | 11/1971 | Shachter | 464/109 |

FOREIGN PATENT DOCUMENTS

| | | | |
|---|---|---|---|
| 904256 | 7/1945 | Fed. Rep. of Germany | 464/124 |
| 2952029 | 7/1981 | Fed. Rep. of Germany | |
| 2476251 | 8/1981 | France | |
| 2506872 | 12/1982 | France | |
| 59-40016 | 3/1984 | Japan | 464/905 |
| 2119478 | 11/1983 | United Kingdom | 464/111 |

Primary Examiner—Daniel P. Stodola
Attorney, Agent, or Firm—Wenderoth, Lind & Ponack

[57] ABSTRACT

A joint including a spider element (2) whose four branches each define a pair of raceways (4), a barrel (11) on the exterior of which are pivotally mounted jaws (13) each defining two spherical concave bearing surfaces (18), and intermediate elements (21) of planar-convex shape, disposed between the raceways and the spherical bearing surfaces. Needles (23) maintained by cages (24) are interposed between the intermediate elements and the raceways. Such a joint provides great freedom of axial sliding, even at high operating speed.

8 Claims, 5 Drawing Figures

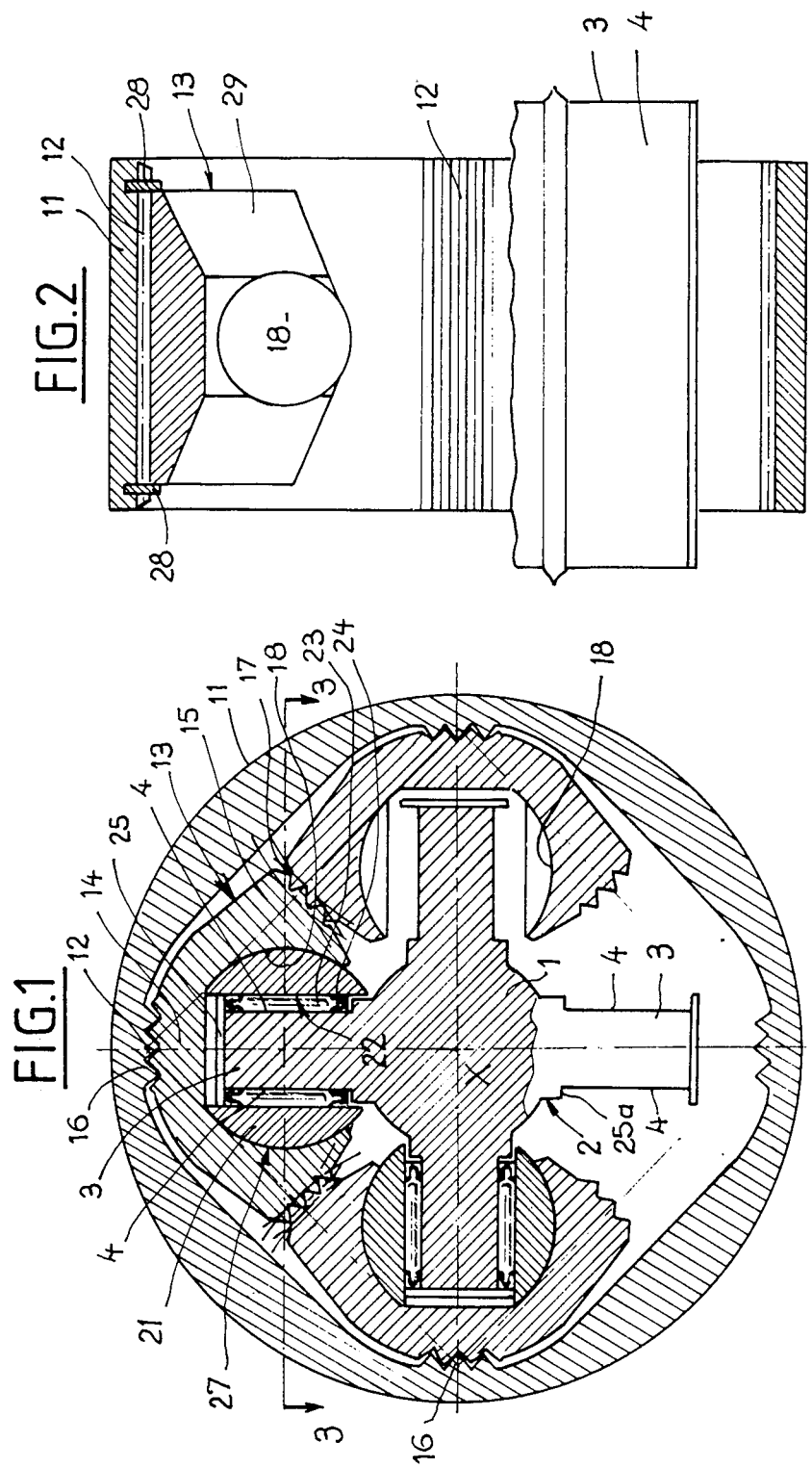

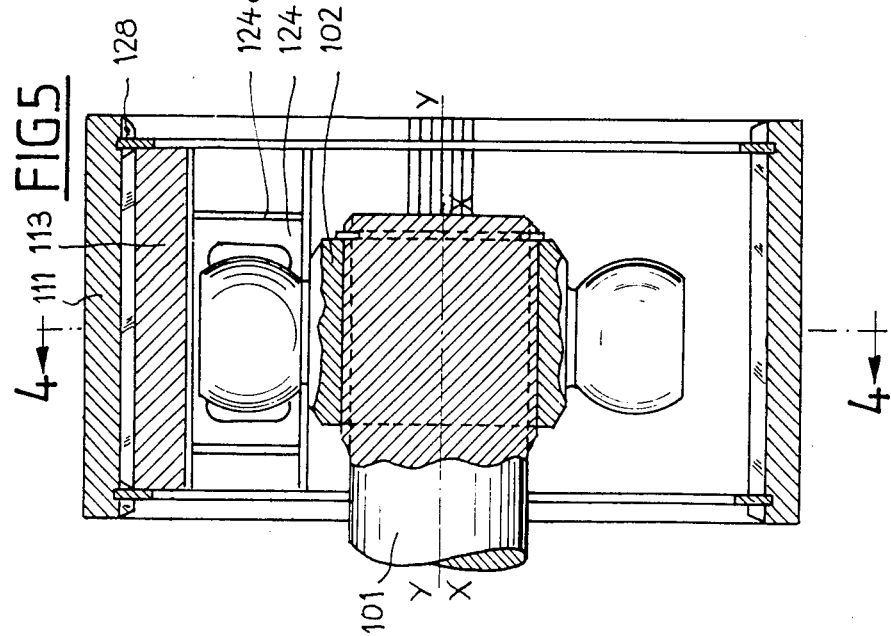
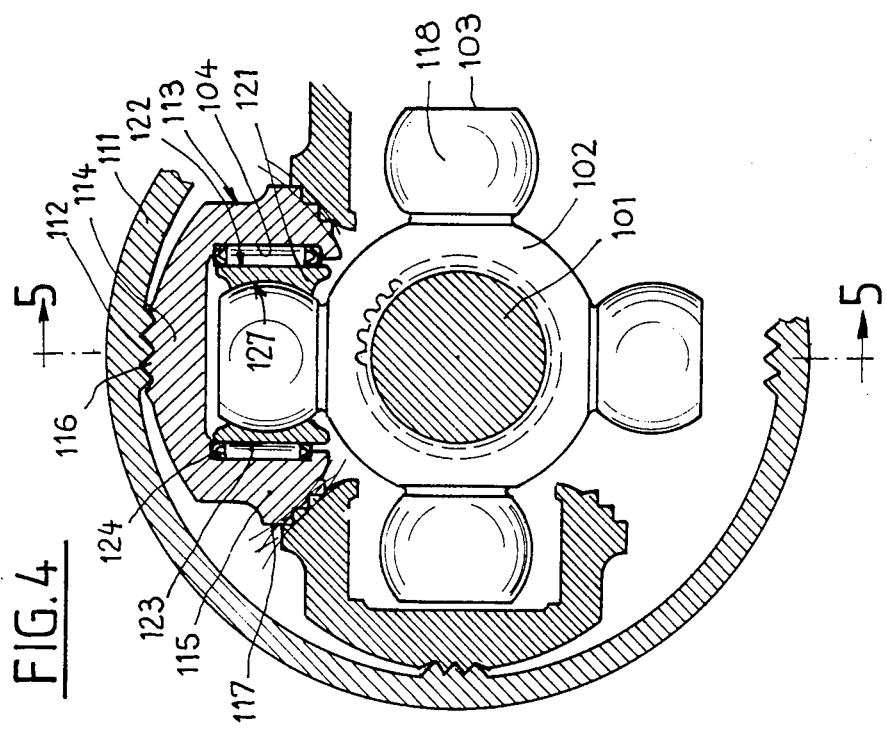

HOMOKINETIC JOINT HAVING PIVOTABLE JAWS WITH COMPLEMENTARY SETS OF TEETH FOR CONJUGATE PIVOTAL MOVEMENT THEREOF

BACKGROUND OF THE INVENTION

1. Field of the Invention

The present invention relates to homokinetic joints which may be used in particular in lateral transmissions of front-wheel drive vehicles, or vehicles which are propelled through independent wheels, and in longitudinal transmissions conventionally equipped with universal joints.

2. Description of the Prior Art

There is known from the patent FR-A-81 10 796, corresponding to U.S. Pat. No. 4,490,126, a telescopic homokinetic joint comprising a first element having three pairs of planes evenly spaced angularly apart around a first axis, the planes of each pair being parallel to each other and to this first axis, a second element defining three spherical bearing surfaces which are evenly angularly spaced apart around a second axis, and intermediate elements comprising, on one hand, planar surfaces, respectively parallel to said planes and, on the other hand, spherical surfaces cooperating with said spherical bearing surfaces, rolling elements, in the present instance needles, being interposed between the planar surfaces of the intermediate elements and the planes of the first element.

Such a joint affords a considerable improvement in the comfort of the vehicle in which it is installed by its very free sliding under torque for small angularities (less than 5°), and by a complete neutrality in axial translation and in bending moment when it operates under a medium angularity, for example between 8° and 6°.

However, in applications in which the transmission rotates at high speed (for example exceeding 4,000 rpm), this technique which performs well at moderate speed is no longer fully satisfactory.

SUMMARY OF THE INVENTION

An object of this invention is to provide a homokinetic joint, having all the qualities of comfort of the joint described in said French patent and, moreover, capable of operating under the best conditions at high speed.

The invention therefore provides a homokinetic transmission joint, comprising a first element having a first axis and including four pairs of raceways evenly spaced around said axis, the raceways of each pair being parallel to each other and to said first axis, a second element having a second axis which intersects or is in alignment with the first axis and comprising four spherical bearing surfaces evenly spaced apart around the second axis, each of the spherical bearing surfaces confronting a respective pair of raceways, an intermediate member disposed between each of the raceways and a respective one of the spherical bearing surfaces, rolling members being interposed between the intermediate members and the raceways, wherein each pair of raceways are formed in a first part and a respective pair of spherical bearing surfaces are formed in a second part which together with the first part comprises a pair of parts, one of the parts of each pair being mounted relative to the element with which it is associated in such manner as to be pivotable about an axis which is parallel to the axis of said associated element and which is radially offset relative to the center of the corresponding spherical bearing surface, each pivotable element comprising sets of teeth engaged with complementary sets of teeth of adjacent pivotable elements, said sets of teeth being adapted to permit the movements of the pivotable elements relative to the associated element.

According to other features of the invention:

the raceways are planar and the intermediate elements have planar confronting surfaces, the rolling elements being needles maintained by at least one cage;

the raceways have a cylindrical shape, whose generatrices are parallel to the axis of the first element and there are provided raceways of similar shape in the intermediate elements, the rolling elements being balls maintained by at least one cage;

one of the two elements comprises a spider element having four branches each of which has opposed surfaces, one part of the pair of parts comprising one of the branches;

one of the two elements comprises a cylindrical barrel having an inner surface, the pivotable parts of the pair of parts comprising jaws pivotally mounted on the inner surface of the barrel, each jaw comprising an arch having an outer wall having pivoting means thereon cooperating with conjugate means provided on the inner wall of the barrel, the jaws including along free edges thereof sets of teeth engaged with complementary sets of teeth of adjacent jaws;

the connection between each pivotable part and the associated element is a non-sliding, rolling connection between the conjugate sets of teeth;

the connection between each pivotable part and the associated element is constituted by a pin constituting a pivot.

BRIEF DESCRIPTION OF THE DRAWINGS

The invention will now be described in more detail hereinafter with reference to the accompanying drawings which are given merely by way of example and in which:

FIG. 1 is a cross-sectional view of a first embodiment of a joint according to the invention, some component parts of this joint having been omitted in the interest of simplification and clarity;

FIG. 2 is a longitudinal sectional view of the joint, some of the component parts having been broken away or omitted in order to show in elevation a part of the two essential elements of the joint;

FIG. 4 is a partial cross-sectional view of a second embodiment of a joint according to the invention, and FIG. 5 is a sectional view taken on line 5—5 of FIG. 4.

DETAILED DESCRIPTION OF THE PREFERRED EMBODIMENTS

Figure 3:
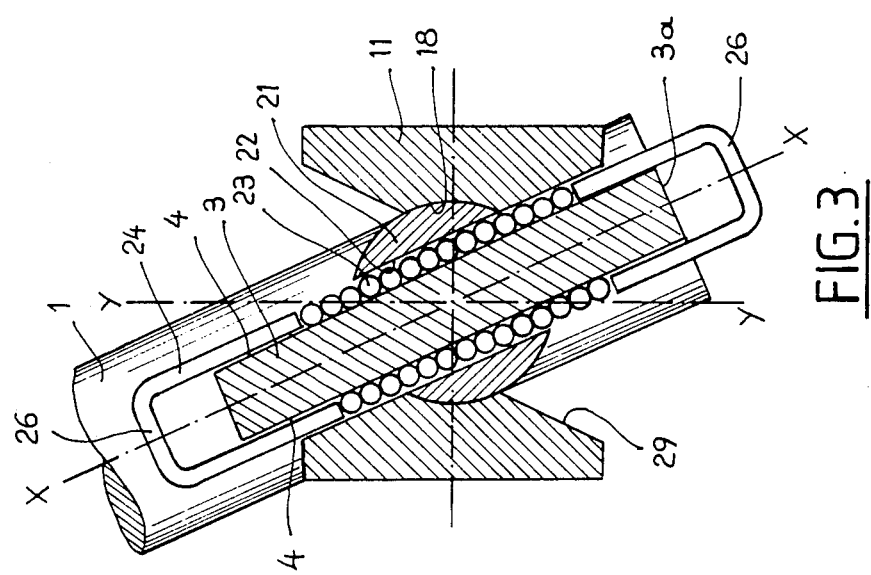
FIG. 3 is a sectional view taken on line 3—3 of FIG. 1 of the position of certain elements of the joint when the latter is operating at an angle.

With reference first of all to FIGS. 1 to 3, there is shown in the drawing a joint comprising a first element constituted by a shaft 1 having an axis X—X, as shown in FIGS. 3 and 5, and including, in one piece therewith or mounted thereon in any suitable way, a spider member 2 whose four branches 3 are disposed radially at 90° to each other. Each of these branches defines two planar surfaces 4 which are parallel to each other and to the axis X—X and constitute raceways.

The second element of this joint is formed by a tube or barrel 11 of cylindrical shape having an axis Y—Y, as shown in FIG. 5 which may be fixed to a shaft (not shown) by known means, such as a bolted flange, splined or broached stub-axle, welding, etc. This barrel is provided internally with four toothed raceways 12 which extend longitudinally and are evenly spaced apart on the inner periphery of this barrel.

Mounted inside the latter are four jaws 13 comprising an arch 14 and two side portions 15. Along the outer surface of their arch, the jaws include longitudinal sets of teeth 16 engaged with the sets of teeth 12 on the barrel, the profiles of these teeth being so chosen as to allow a pivoting of each jaw about a pivot axis parallel to the axis Y—Y. These sets of teeth have for example an involute profile.

The pivoting movements of the four jaws are made conjugate for the provision of longitudinal sets of teeth 17 provided at the ends of the side portions of these jaws and in mutual engagement. The profiles of these conjugate sets of teeth are so chosen that each jaw is capable of pivoting relative to the barrel. With such an arrangement, each jaw pivots about its pivot axis in a direction opposed to that of the adjacent jaws.

Further, each jaw includes in confronting parts of its side portions, concave spherical cavities formed by spherical bearing surfaces 18 centered on the longitudinal planes of symmetry of the branches of the spider member. The pivot axes of the jaws relative to the barrel are therefore disposed radially outside the centers of the spherical bearing surface 18. Intermediate members 21 having a meniscus shape or a planar-convex (plano-convex) lens shape, are disposed between the lateral surfaces 4 of the branches of the spider member and the bearing surfaces 18 of the jaws. The planar surfaces 22 of each of the intermediate members bear on and roll along a ring arrangement of rolling members such as needles 23 which bear against and roll along the raceways 4. These needles can be in adjoining relation as shown in FIG. 3 and maintained by their ends in a cage 24 uniting two rows or series of needles. As a modification, they may also be spaced from each other and disposed in two separate ring arrangements of needles. Retaining plates 25 radially maintain these rows or series of needles while allowing them the necessary operational play toward an inner guiding surface 25a.

The cages each comprise two bridge portions 26 also acting as an end-of-travel abutment for the rolling members in contact with the ends 3a of the branches of the spider member or quadriplanar member 2.

The convex surfaces 27 of the members 21 are received in the concave spherical cavities 18 of the jaws.

The jaws 13 are axially retained by rings or circlips 28 received in receiving grooves in the barrel, although other like means may be employed. Recesses 29 (FIG. 3) provided on these jaws permit the rotation through an angle of the shaft 1 relative to the barrel 11.

When a torque is applied to the shaft 1 and therefore to the spider member 2, the jaws 13 cannot pivot relative to the barrel since their movements due to the torque would counter this owing to the action of the combined sets of teeth 17, which have for effect to prevent any pivoting of the jaws under the action of the torque. On the other hand, the forces applied are evenly distributed between the four jaws, this occurring even despite a defect in the circular division of the spider member or of the inner splines of the barrel. In other words, the connection between the spider member and the jaws is isostatic.

Such a joint is perfectly homokinetic. Moreover, it has a very high torque-transmitting capacity which is much higher than that of a universal joint having the same overall size. It also affords the interesting possibility of a very free axial sliding under torque, when the joint elements are in alignment or at an angle to each other, and a perfect axial neutrality, even in respect of high operating needs.

FIGS. 4 and 5 show a modification of such a homokinetic joint.

Relative to the first embodiment, the positions of the raceways and the spherical bearing surfaces are reversed. The elements corresponding to those of FIGS. 1 to 3 are designated by the same reference numerals but increased by 100. The spherical bearing surfaces 118 are defined by the branches 103 of the spider member 102, which is fixed by any suitable means to the shaft 101.

The jaws 113, which are moreover roughly similar to those shown in FIGS. 1 to 3, include in their confronting inner surfaces planar raceways 103 which are parallel to each other and to the axis Y—Y. The intermediate members 121 here advantageously have a shape of revolution, i.e. a "cup" or planar-concave (plano-concave) shape, the rolling members such as needles 123 being interposed between outer planar surfaces 122 of the intermediate members or cups and the raceways 104 of the planar jaws. These cups could also have a rectangular or oval shape when viewed in plan, without departing from the scope of the invention. The ring arrangements of needles are maintained and guided by cages 124 whose relative travel is limited by abutment of the edge of the cups on a formed over edge portion 124a These cages may be constructed as taught in the French patent applications FR-A-83 17 576, which corresponds to U.S. Pat. No. 4,592,735, and FR-A-83 17 578, which corresponds to U.S. Pat. No. 4,619,628, and include return devices disclosed in these two patents. The inner concave surfaces 127 of the cups 121 may oscillate on spherical bearing surfaces 118 of the trunnions 103.

The jaws 113 and the barrel 111 comprise, as in the first embodiments, sets of teeth 112, 116, 117 permitting the oscillation of the jaws relative to the barrel and their conjugate oscillation. These jaws are also, as before, axially retained in the barrel by circlips 128 or any other like means.

The operation and the advantages of this second embodiment are the same as those of the first embodiment.

Other modifications may of course be envisaged. Thus, the rolling members may be formed by balls, in which case there are provided in the confronting planar surfaces, cylindrical raceways having a circular section for receiving the balls.

Further, the complementary means allowing the oscillation of the jaws relative to the barrel may be formed by means other than sets of teeth, for example by means of of a fixed pin embodied by a cylindrical surface carried by a pivot of hardened steel disposed, on one hand, in a recess or longitudinal cylindrical groove machined inside the barrel and, on the other hand, a similar groove machined longitudinally on the back of the adjacent jaw.

What is claimed is:

1. A homokinetic transmission joint, comprising a first joint element having a first axis and including four pairs of raceways evenly spaced apart around the first axis, the raceways of each pair being parallel to each other and to said first axis, a second element having a second axis capable of intersecting or being in alignment with the first axis, the second element including spherical bearing surfaces evenly spaced apart about the second axis, each of the spherical bearing surfaces confronting at least one raceway of a respective pair of raceways, an intermediate member disposed between each of the raceways and a respective one of the spherical bearing surfaces, rolling members interposed between the intermediate members and the raceways, wherein each pair of raceways are formed in a first part and at least one respective spherical bearing surface is formed in a second part which together with the first part comprises a pair of parts, one of the parts of each pair being mounted on the element with which it is associated in such manner to be pivotable about an axis which is parallel to the axis of said associated element and which is radially offset relative to the center of the corresponding spherical bearing surface, each pivotable part comprising sets of teeth engaged with complementary sets of teeth of adjacent pivotable parts, said sets of teeth being adapted to permit the movements of the pivotable parts relative to the associated element.

2. A joint according to claim 1, wherein one of the two elements comprises a spider element having four branches each of which has opposed surfaces comprising a respective pair of the four pairs of raceways, one part of the pair of parts comprising one of said branches.

3. A joint according to claim 2, wherein the connection between each pivotable part and the associated element is a non-sliding, rolling connection between the conjugate sets of teeth.

4. A joint according to claim 1, wherein one of the two elements comprises a barrel of cylindrical shape having an inner surface, the pivotable parts of the pair of parts comprising jaws pivotally mounted on the inner surface of the barrel, each jaw comprising an arch having an outer wall having pivoting means thereon cooperative with conjugate means provided on the inner wall of the barrel, said jaws including along free edges thereof sets of teeth engaged with complementary sets of teeth of adjacent jaws.

5. A joint according to claim 4, wherein each of the jaws includes two side portions connected by the arch thereof, the side portions of the jaws having inner confronting sides having concave surfaces which comprise the spherical bearing surfaces, the other one of the elements comprising a spider element having branches, each of which has opposed surfaces comprising a respective pair of the four pairs of raceways.

6. A joint according to claim 4, wherein each of the jaws includes two side portions connected by the arch thereof, the side portions of the jaws having inner confronting sides having surfaces which comprise a respective pair of the four pairs of raceways, the other one of the elements comprising a spider element having four branches with convex spherical surfaces comprising the spherical bearing surfaces, the intermediate members having concave surfaces cooperative with the convex spherical surfaces of the branches of the spider element.

7. A joint according to claim 4, wherein each of the jaws include side portions connected by the arch thereof, the side portions including recesses in inner surfaces thereof allowing angular movements of the other element of the joint.

8. A joint according to claim 1, wherein the raceways are planar and the intermediate members have confronting planar surfaces, the rolling members being needles retained by at least one cage.

* * * * *